United States Patent [19]

Kosaka et al.

[11] Patent Number: 4,841,364
[45] Date of Patent: Jun. 20, 1989

[54] SYSTEM FOR CONFIRMING THE RELEASE OF A MOLDED ARTICLE IN AN INJECTION MOLDING APPARATUS AND FOR DETERMINING THE QUALITY OF THE ARTICLE

[75] Inventors: Norindo Kosaka; Chikatoshi Yamaguchi, both of Shizuoka, Japan

[73] Assignee: Kawaguchi, Ltd., Shizuoka, Japan

[21] Appl. No.: 182,210

[22] Filed: Apr. 15, 1988

[51] Int. Cl.$^4$ .............................................. H04N 7/18
[52] U.S. Cl. .................................. 358/101; 358/106; 425/137
[58] Field of Search ..................... 358/101, 106, 93; 425/137

[56] References Cited

U.S. PATENT DOCUMENTS

| | | | |
|---|---|---|---|
| 3,049,588 | 8/1962 | Barnett | 358/106 |
| 3,642,401 | 2/1972 | Wilson | 358/106 |
| 4,236,181 | 11/1980 | Shibata | 358/106 |
| 4,603,329 | 7/1986 | Bangerter | 425/137 |

Primary Examiner—Howard W. Britton
Attorney, Agent, or Firm—Beveridge, DeGrandi & Weilacher

[57] ABSTRACT

A system for confirming proper release of a molded article fron an injection molding machine and for determining the quality of this article. The system includes a first video camera for monitoring an outer surface of a male mold half and providing image data indicative thereof, a second video camera for monitoring an inner surface of a female mold half and providing image data indicative thereof, and a control unit. The control unit includes a memory for storing reference image data and image data provided by the first and second cameras and a comparator for comparing the provided image data and the stored reference image data to confirm release of the molded article and to determine the quality of the article. The presence or absence of residual resins on the outer surface of the male mold half and on the inner surface of the female mold half is also determined.

11 Claims, 3 Drawing Sheets

SYSTEM FOR CONFIRMING THE RELEASE OF A MOLDED ARTICLE IN AN INJECTION MOLDING APPARATUS AND FOR DETERMINING THE QUALITY OF THE ARTICLE

BACKGROUND OF THE INVENTION

The present invention relates to a system for determining the quality of a molded article and confirming the release of the article from the mold halves in an injection molding apparatus.

Conventional systems for confirming the release of molded articles from an injection molding apparatus have been of the photoelectric type, the electrical contact type, or the gravimeter type. Further, there are several prior art systems, such as mold monitoring systems, wherein an image of a male or movable mold half is formed on an image forming medium, a plurality of luminance sensors are arranged on this image, and by monitoring the detected luminance data, the system determines whether the molded articles are on the movable mold half or have been ejected and thus released so that no molded article remains on the movable mold half. An example of such a system is disclosed in Japanese Patent Application Publication No. 60573-1985. A system for optically monitoring only the movable mold half by a television (TV) camera or the like is disclosed in Japanese Patent Application Publication No. 4616-1983, and a system for confirming the release of an article in a molding apparatus is disclosed in Japanese Utility Model Application No. 421481-1977.

These conventional systems have disadvantages. For example, the conventional systems are complicated. They are subject to frequent failure, and their efficiency is poor. The time necessary for the injection molding apparatus to perform a molding cycle is prolonged. Productivity is thus reduced. Also, it is necessary to perform adjustments to such conventional systems each time the mold is changed.

The conventional systems have another disadvantage. The conventional systems monitor only the movable mold half and view it in only one direction. During operation of such conventional systems, it is assumed that so long as the molded article is found to be present on the movable mold half, no molding material residue remains on the stationary or female mold half. The stationary mold half, however, may be subject to damage as a result of resin leaks at the nozzle or gate of the molding apparatus or to damage due to clogging of the nozzle or gate by solidification of residual resin following, for instance, disconnection of the heater for a hot runner mold.

Another disadvantage is that the quality of the molded article cannot be determined reliably.

SUMMARY OF THE INVENTION

It is an object of the present invention to provide a system for monitoring an injection molding apparatus to confirm the release of a molded article or articles from the apparatus and to determine the quality of the article or articles.

This objective is achieved by the system according to the present invention which system comprises video camera means including a first video camera for monitoring the outer surface of a male mold half and a second video camera for monitoring the inner surface of a female mold half. The system also comprises a control unit having a circuit for comparing the image data transmitted from either the first or the second video camera with a plurality of reference image data previously stored in a memory of the control unit to confirm proper release of a molded article and to determine the quality of the article.

According to the present invention, by comparing the image data indicative of the outer surface of the male mold half with reference image data, the quality of the molded article can be determined. Also, by comparing the image data indicative of the outer surface of the male mold half with corresponding reference image data, release of the molded article, namely, that the molded article has been removed from the mold and dropped from the mold halves, can be confirmed. Further, by comparing image data indicative of the inner surface of the female mold half with other reference image data, the presence or absence of residual resin on the inner surfaces of the female mold half can be detected to prevent damage to the mold halves by such residual resin.

According to the invention, since only a plurality of video cameras and a control unit are required, the system is simple, the failure rate of the system is extremely low, and the cost of the system is small. The molding cycle times for a molding machine monitored by the system of the present invention can be reduced to improve productivity.

In a preferred embodiment of the system of the invention, the control unit selectively receives data from one of the plurality of video cameras used to monitor the mold halves as determined by means of internal switches. Also, according to a preferred embodiment of the present invention, several injection molding apparatus can be controlled by one control unit. The system of the present invention monitors to confirm the proper release of the molded articles and the quality of the articles for each controlled molding apparatus.

According to the preferred embodiments of the invention, when reference image data are transmitted to the control unit, the mean value of the luminances at a plurality of predetermined positions on the surface of the mold halves is stored in a random access memory (RAM). According to such implementation, necessary adjustments following replacement of one mold by another in the machine are easily made. Again the result is improved productivity.

In implementing the system of the present invention, the control unit includes a deciding circuit having a device for halting operation of the injection molding apparatus when the system detects that an article has not been released properly from the mold halves or that residual resin remains on the mold halves. The system also includes means for providing an alarm signal upon detection of either of the foregoing abnormal conditions. According to such an implementation, prompt correction of such abnormal conditions can be made following the alarm signal to reduce molding cycle time and prevent damage to the mold.

Further in accordance with a preferred embodiment of the invention, the deciding circuit of the control unit is provided with means for activating an apparatus, such as a reversing shooter or the like, to eliminate completed articles which are determined to be defective.

BRIEF DESCRIPTION OF THE DRAWINGS

These and other aspects and features of the present invention will become more apparent from the following detailed description and claims with reference to the accompanying drawings. In the drawings:

DETAILED DESCRIPTION OF PREFERRED EMBODIMENTS

Figure 1:
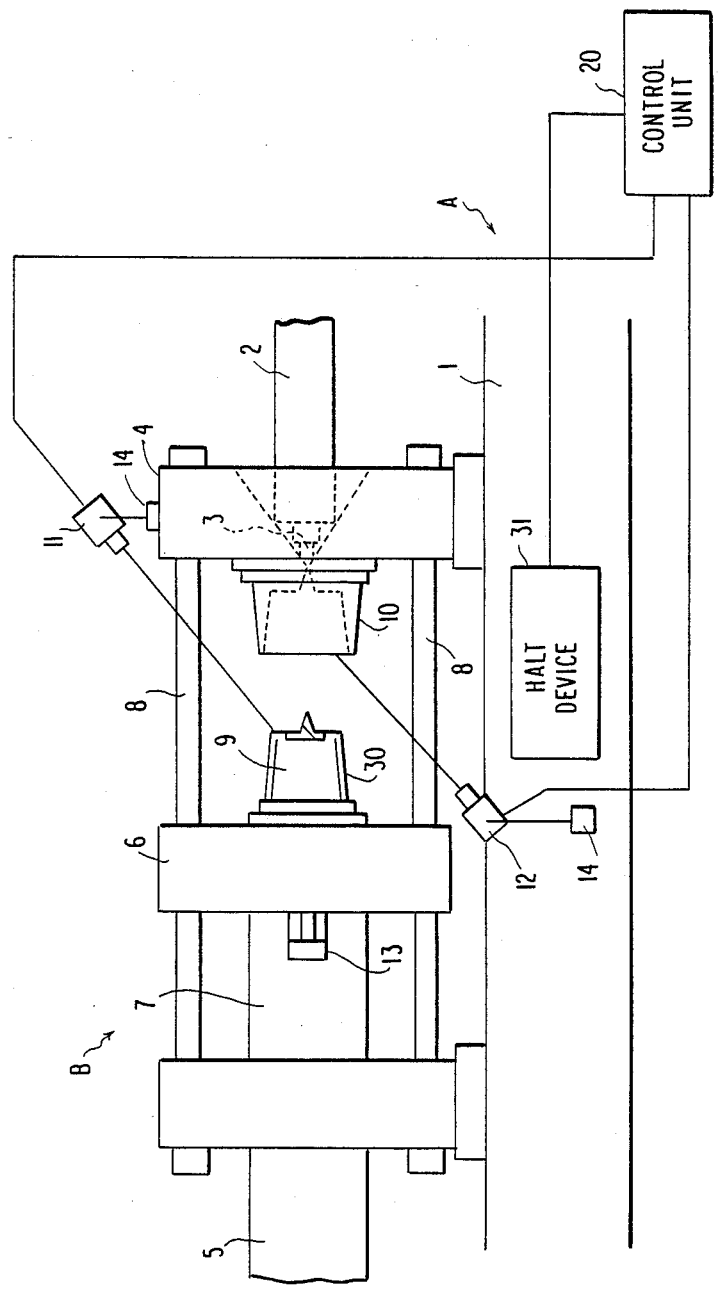
FIG. 1 is a schematic diagram showing a preferred embodiment of a system according to the present invention for confirming the release of a molded article from a mold and for determining the quality of the article in association with an injection molding apparatus.

FIG. 1 schematically shows a first embodiment of the system according to the present invention generally identified by the reference character A, in association with an injection molding machine, generally identified by B. In FIG. 1 a stationary platen 4 is shown fixed to a bed 1 of the injection molding machine B. A nozzle 3, indicated by the dash line, is provided on the heating cylinder 2. A molten plastic material (not shown) which is heated in a heating cylinder 2, is injected through the nozzle 3 by an injection screw (not shown) provided in the heating cylinder. A movable platen 6 is fixed to the ram 7 of a clamping cylinder 5 and is guided by tie bars 8 for reciprocal movement in opposite directions on the bed 1. A male mold half 9 is mounted to the movable platen 6. A female or stationary mold half 10 is affixed to the stationary platen 4.

A first video camera 11, for monitoring the outer surface of the movable mold half 9, is provided on stationary platen 4. A second video camera 12, for monitoring the inner surface of the stationary mold half 10, is disposed on the bed 1. An ejector means 13 is provided for removing a molded article and causing the article to drop from the movable mold half 9. Magnetic stands 14 are provided for securing the cameras 11 and 12. The first and second video cameras 11 and 12 are connected to a control unit 20.

Figure 2:
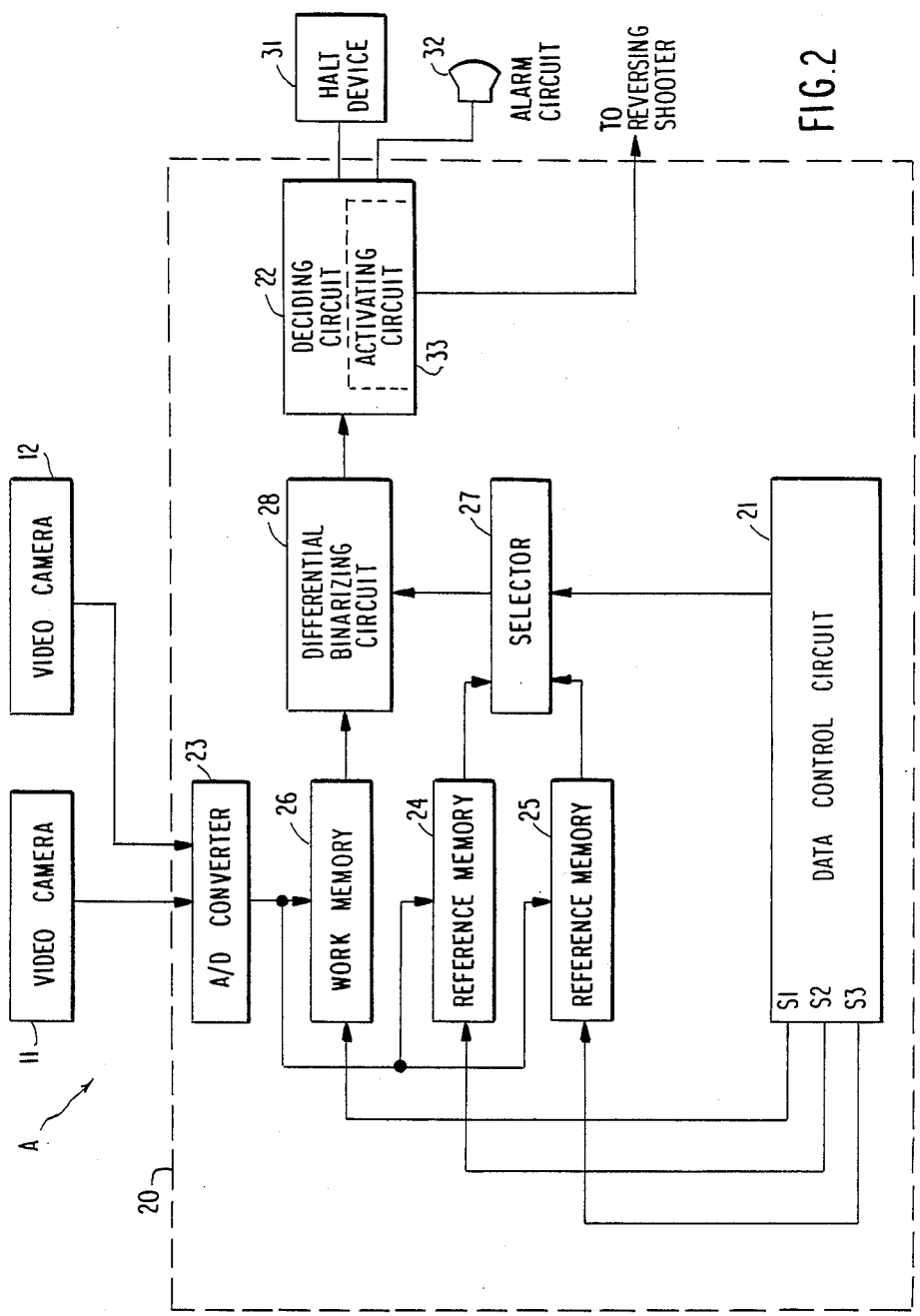
FIG. 2 is a block diagram of the system according to present invention.

FIG. 2 shows the circuitry of system A according to the present invention in block diagram form including video cameras 11 and 12 and control unit 20. Control unit 20 is implemented with conventional components. The control unit 20 includes an analog-to-digital (A/D) converter 23 connected to video cameras 11 and 12 for converting analog image data provided by the cameras to digital data. At its output, A/D converter 23 is connected to reference memories 24 and 25 and a work memory 26 which are random access memories. Memory 24 receives reference digital data indicative of an acceptable molded article on the male mold member 9 from converter 23 and stores this data. Likewise, reference memory 25 receives and stores reference digital data representing the bare mold halves 9 and 10, without a molded article. Work memory 26 stores digital data indicative of the mold halves 9 and 10 for comparison with the reference data as will be discussed below.

A selector 27 is connected to the first and second reference memories 24 and 25 for selectively receiving reference data from either memory. A differential binarizing circuit 28 receives data from the selected reference memory according to the selection made by the selector 27 and data from the work memory 26 and then compares the data from the work memory with data from the selected reference memory. Binarizing circuit 28 provides an output of "0" or "1", depending upon the result of its comparison, to the input of deciding circuit 22, one output from which is applied to an alarm circuit 32 and another output from which is applied to a device 31 capable of halting further operation of the injection molding machine B. According to the signal received from the binarizing circuit 28, the deciding circuit 22 makes a determination of the quality of the molded article and/or makes a determination as to whether the article was successfully released from the mold members. Deciding circuit 22 includes an activating circuit 33 for activating a reversing shooter (not shown) in the molding machine to eliminate defective articles.

Control unit 20 is also provided with a data control circuit 21 for regulating operation of the control unit. Data control circuit 21 is connected to each of memories 24, 25 and 26 and selector 27 and includes means in the form of switches S1, S2 and S3 for regulating data transmission from the A/D converter 23 to the memories and from the memories to the binarizing circuit 28.

With reference to FIGS. 1 and 2, the system A according to the present invention and the molding machine B may be operated to provide the reference data as follows. First, prior to operation of the molding machine B, the switch S3 in the data control circuit 21 is closed while switches S1 and S2 remain open. Then, image data indicative of a plurality of predetermined locations on the surfaces of both mold halves 9 and 10 are provided by video cameras 11 and 12 and preliminarily stored as digital reference data in the reference memory 25. Next, hydraulic pressure is applied to the clamping cylinder 5 to move the ram 7 to the right in FIG. 1 until the mold half 9 properly mates with the mold 10. Thereafter, mold halves 9 and 10 are subjected to compressional force and molten plastic material is injected through nozzle 3 into the cavity formed by the mold halves to form a molded article 30. After the molded article 30 has cooled and solidified, the clamping cylinder is caused to move in the opposite direction, to the left in FIG. 1, to thereby move the ram 7 and open the mold. Thereafter, confirmation is made in any conventional way, such as by visual inspection, that the molded article 30 is acceptable.

Next, the switch S3 is opened and switch S2 of the control circuit 21 is closed whereby reference image data which represent a plurality of predetermined locations on the surface of the acceptable molded article 30 are provided by the first video camera 11 and stored as digital reference data in the reference memory 24. Preferably, mean data values, obtained from images of the same locations on the surfaces of several acceptable articles are stored in the first reference memory 24. Next, the acceptable article 30 is ejected by the ejector 13 to remove and drop the article from the male mold half A.

During subsequent operation of the molding machine B, the switch S2 is opened and the switch S1 of the control circuit 21 is closed. Then the clamping and injection steps are executed. Each time the clamp is opened to discharge a molded article of unknown quality, image data indicative of the selected locations on the surface of the molded article, provided by the first camera 11, are stored as digital data in work memory 26. Next, data control circuit 21 causes selector 27 to select reference memory 24 to provide reference data indicative of the acceptable molded article 30 to the differential binarizing circuit 28. Binarizing circuit 28 then compares the data received from the work memory 26 with the reference data to determine the quality of the new molded article. If the data from the work memory 26 lies within a predetermined allowable luminance range with respect to the reference data from the first reference memory 24, it is binarized by the binarizing circuit 28 to have a value "0" to denote an acceptable article. If the data from the work memory 20 is not within the allowable range, it is binarized to "1" to identify the article as defective. Accordingly, on the basis of the binarized value, the deciding circuit 22 decides whether the molded article is acceptable or defective. If the article is determined to be defective, the deciding circuit 22 activates, by means of circuit 33, a device such as a reversing shooter or the like (not shown) to eliminate the defective article. If the new molded article is determined to be acceptable, it is dropped from the male mold member 9 by action of the ejector 13.

After the ejection of the article, the first camera 11 again provides image data corresponding to the plurality of predetermined locations on the outer surface of the movable mold half 9 to the work memory 26 for storage therein. Then reference image data representing the same locations on the outer surface of the mold half 9 without an article thereon, previously stored in the second reference memory 25, is compared with the data in the work memory 26 by the binarizing circuit 28. The result of the comparison is likewise binarized by the circuit 28. If the compared data corresponds, the deciding circuit 22 determines that the new molded article was properly ejected and that no residual resin material remained on the male mold half 9. Otherwise, the deciding circuit 22 determines that the ejector 13 failed to eject the article to effect a proper release from the mold or that residual material remains on the monitored mold half 9.

Next, image data representative of predetermined locations on the inner surface of the stationary mold half 10 are provided by the second camera 12 and stored in the work memory 26. Then, data indicative of the mold half 10 stored in the second reference memory 25, selected by the selector 27, is compared with the data in the work memory 26 and the result of the comparison is binarized by the binarizing circuit 28. The presence or absence of residual resin on the mold half 10 is thus determined by the deciding circuit 22 according to the comparison. In the preferred embodiment, when the deciding circuit determines that any of the foregoing abnormal conditions is present, the deciding circuit applies an output signal to device 31 to stop the operation of the injection molding apparatus B. Also, the deciding circuit 22 activates the alarm unit 22 which could have a buzzer or the like to apprise an operator of the detected abnormal conditions.

Figure 3:
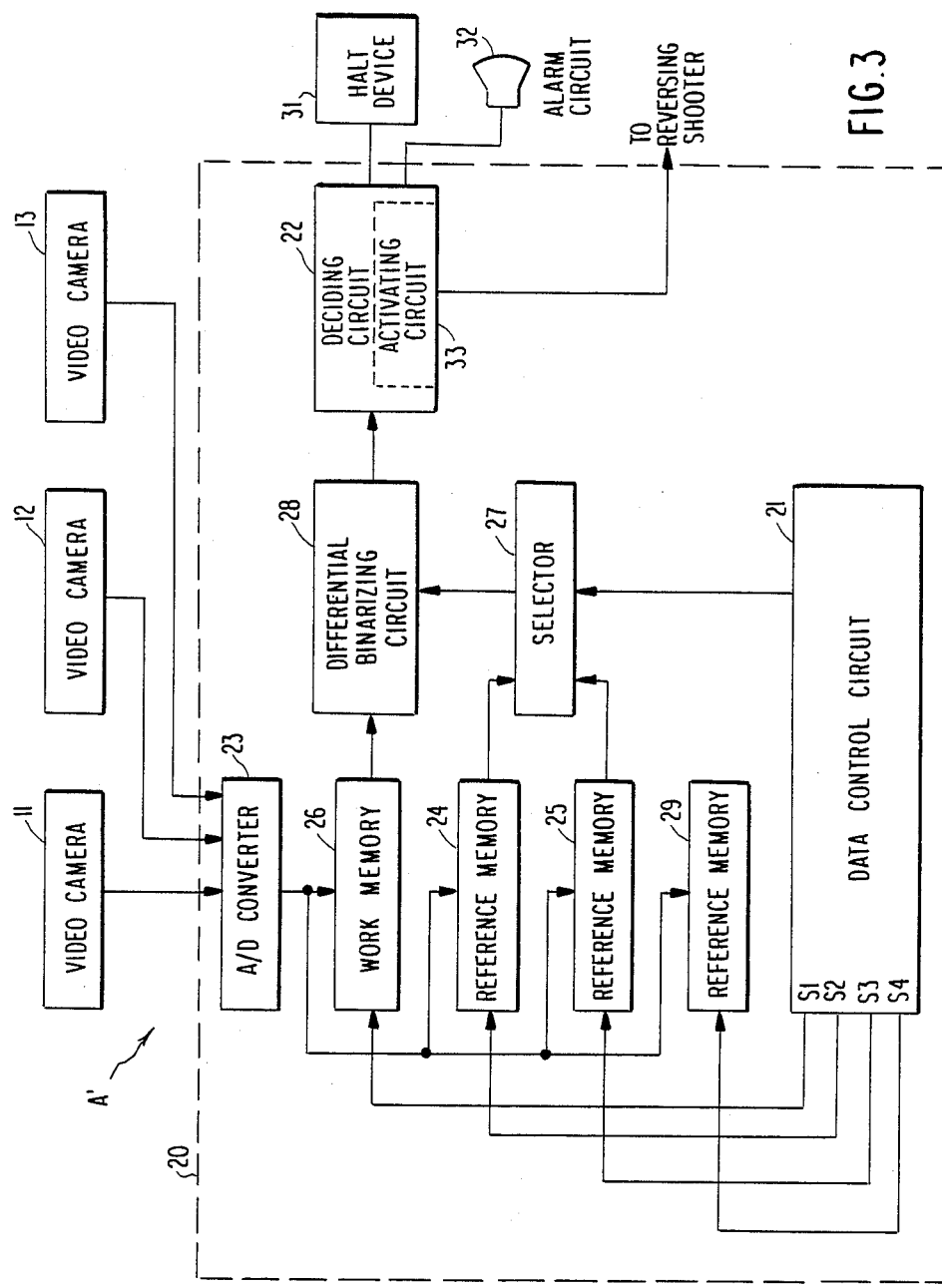
FIG. 3 is a block diagram, similar to FIG. 2, of another embodiment of the system of the present invention.

According to the embodiment of FIGS. 1 and 2, the System A includes two video cameras 11 and 12 connected to the control unit 20 which has the reference memories 24 and 25 and the work memory 26 to detect the aforementioned three abnormal conditions. The invention of course is not limited to such an implementation. FIG. 3 shows another embodiment of the system of the present invention which is generally identified by reference character A'. System A' includes a third video camera 13 and a third reference memory 29. The third camera 13 and third reference memory 29 provide for improved accuracy. Otherwise, the embodiments of FIGS. 2 and 3 are the same.

Further according to the system of the present invention, a plurality of video cameras can be provided for monitoring each of a plurality of molding apparatus, with each such pair connected to the same control unit 20 to control each injection molding apparatus.

As described above, according to the invention, an effective release of a molded article can be confirmed, the quality of the molded article can be determined, and at the same time, by monitoring the presence or absence of residual resin on the mold halves, damage to the mold can be prevented. Thus, the average time for molding cycles can be reduced and productivity improved by control of the molding apparatus by the system of the present invention. Further, according to the invention, since it is sufficient to provide a plurality of video cameras and one control unit, the structure is simple, the failure rate of the system is low, and the cost of such a system is small.

The present invention is not limited to the foregoing embodiments and many modifications and variations are possible.

What is claimed is:

1. A system for detecting release of a molded article and determining the quality of the article in an injection molding machine having at least two mold members for forming a mold, said system comprising:
    a first video camera for monitoring a first mold member and providing surface image data indicative thereof;
    a second video camera for monitoring a surface of a second mold member which mates with the first mold member, and providing surface image data indicative thereof; and
    control means including memory means for storing reference image data and the provided surface image data, means for comparing the reference image data and the provided surface image data, and means for determining the quality of a molded article and detecting release of the molded article from the mold members based upon comparison by said comparing means.

2. A system as claimed in claim 1, wherein said memory means comprises a first reference memory for storing reference image data indicative of an acceptable molded article disposed on a monitored surface of the first mold member, a second memory for storing reference image data indicative of the monitored surface of the first mold member with no molded article disposed thereon and reference image data indicative of the monitored surface of the second mold member, and a work memory for storing the provided image data.

3. A system as claimed in claim 2, further comprising a third video camera and a third reference memory for storing image data provided by said third camera.

4. A system as claimed in claim 2, wherein said control means comprises control circuit means for regulating data flow from said cameras to said memories and from said memories to said comparing means.

5. A system as claimed in claim 3, wherein said control circuit means further includes a plurality of switches and selector means.

6. A system as claimed in claim 3, wherein said comparing means is a differential binarizing circuit.

7. A method for monitoring release of an article molded in an injection molding apparatus and determining the quality of the article, said method comprising the steps of:

providing image data indicative of surfaces of a mold of the molding apparatus and image data indicative of surfaces of a molded article;

comparing said provided image data with reference image data; and determining the quality of the molded article and confirming release of the article based upon said comparison.

8. A method as claimed in claim 7, further comprising the steps of:

monitoring the surfaces of the mold and surfaces of an acceptable molded article to provide the reference image data.

9. A method as claimed in claim 7, further comprising the step of determining the presence or absence of residue on the surfaces of the mold based upon said comparison of said image data indicative of said surfaces with said reference image data.

10. A method as claimed in claim 7, wherein the image data is provided as analog data, said method further comprising converting the analog image data to digital data, and storing the digital data.

11. A method as claimed in claim 8, further comprising the steps of repeatedly monitoring the surfaces of the acceptable molded article to provide average reference data indicative of the monitored outer surface.

* * * * *